United States Patent
Kawashima et al.

(10) Patent No.: US 10,396,618 B2
(45) Date of Patent: Aug. 27, 2019

(54) ROTATING ELECTRIC MACHINE WITH SHAFT-SEAL DEVICES HAVING PARTITION PLATE

(71) Applicant: Mitsubishi Electric Corporation, Chiyoda-ku (JP)

(72) Inventors: Koji Kawashima, Tokyo (JP); Shingo Kingetsu, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 940 days.

(21) Appl. No.: 14/406,766

(22) PCT Filed: Nov. 29, 2013

(86) PCT No.: PCT/JP2013/082140
§ 371 (c)(1),
(2) Date: Dec. 10, 2014

(87) PCT Pub. No.: WO2015/079550
PCT Pub. Date: Jun. 4, 2015

(65) Prior Publication Data
US 2016/0134167 A1 May 12, 2016

(51) Int. Cl.
*H02K 5/10* (2006.01)
*H02K 5/124* (2006.01)
(Continued)

(52) U.S. Cl.
CPC ............... *H02K 5/10* (2013.01); *H02K 5/124* (2013.01); *H02K 5/20* (2013.01); *H02K 9/19* (2013.01)

(58) Field of Classification Search
CPC ............ H02K 5/10; H02K 5/124; H02K 5/20; H02K 9/19; F16J 15/40; F16J 15/28; Y10S 277/927; Y10S 277/926
(Continued)

(56) References Cited

U.S. PATENT DOCUMENTS 2,971,783 A * 2/1961 Laser ..................... F16J 15/441
                                                         277/359
3,887,199 A * 6/1975 Sundqvist ................ F16J 15/32
                                                         277/431
(Continued)

FOREIGN PATENT DOCUMENTS

CN          1170832 A        1/1998
JP          57-182663 U      11/1982
(Continued)

OTHER PUBLICATIONS

English Translation from EPO for JP 58186353 A.*
(Continued)

*Primary Examiner* — Julio C. Gonzalez
*Assistant Examiner* — Maged M Almawri
(74) *Attorney, Agent, or Firm* — Buchanan Ingersoll & Rooney PC

(57) ABSTRACT

In a rotating electric machine with shaft-seal devices mounted thereon, an object to provide them is to uniformize a temperature distribution of a sealing ring with a simple structure. The rotating electric machine with the shaft-seal devices mounted thereon includes a rotor having a shaft; a stator disposed in a circumferential surrounding of the rotor; a sealing ring having a plurality of through holes formed therein, being disposed in a circumferential surrounding of the shaft; a gland seal having an oil supply opening therein, for enclosing a circumferential surrounding of the sealing ring; a partition plate disposed between the sealing ring and
(Continued)

the gland seal; and a housing on which the gland seal is fixed, for accommodating the rotor and the stator.

8 Claims, 5 Drawing Sheets

(51) Int. Cl.
*H02K 5/20* (2006.01)
*H02K 9/19* (2006.01)

(58) Field of Classification Search
USPC .................................. 310/87–90; 277/422
See application file for complete search history.

(56) References Cited

U.S. PATENT DOCUMENTS

| | | | | |
|---|---|---|---|---|
| 4,486,024 A | * | 12/1984 | Cooper | F16J 15/40 |
| | | | | 277/422 |
| 4,534,569 A | | 8/1985 | Ishitani et al. | |
| 4,579,349 A | * | 4/1986 | Pipich | F16J 15/26 |
| | | | | 277/422 |
| 4,632,403 A | | 12/1986 | Ishitani et al. | |
| 4,815,748 A | * | 3/1989 | Schubert | F16J 15/441 |
| | | | | 277/422 |
| 7,432,620 B2 | * | 10/2008 | Freal | H02K 5/124 |
| | | | | 277/422 |
| 7,842,013 B2 | * | 11/2010 | Haberland | A61B 17/3462 |
| | | | | 604/167.01 |

FOREIGN PATENT DOCUMENTS

| | | | |
|---|---|---|---|
| JP | 58-005568 A | | 1/1983 |
| JP | 58-186353 A | | 10/1983 |
| JP | 58186353 A | * | 10/1983 ............ H02K 5/124 |
| JP | s58186353 A | * | 10/1983 ............ H02K 5/124 |
| JP | 60-55599 U | | 4/1985 |
| JP | 61-085030 A | | 4/1986 |
| JP | 61085030 A | * | 4/1986 .......... F16C 33/6607 |
| JP | 64-008839 A | | 1/1989 |
| JP | 04266666 | * | 4/1992 |
| JP | 04-266666 A | | 9/1992 |
| JP | 04266666 | * | 9/1992 |
| JP | 09303406 | * | 4/1997 |
| JP | 09-303406 A | | 11/1997 |
| JP | 09303406 | * | 11/1997 |
| JP | 2010-019306 A | | 1/2010 |
| JP | 2012-090397 A | | 5/2012 |

OTHER PUBLICATIONS

English Translation from JPO for JP 61085030 A.*
JP 58186353 A1 English Translation.*
JP 61085030 A1 English Translation.*
JP 09303406 English Translation (Included in document in Q).*
JPs58186353 A English Translation.*
JP 61085030 A English Translation.*
JP 09303406 English Translation.*
JP04266666 English Translation.*
Extended European Search Report dated May 27, 2016, issued by the European Patent Office in the corresponding European Application No. 13886156.2. (7 pages).
Office Action dated Jun. 9, 2017, by the State Intellectual Property Office of the People's Republic of China in corresponding Chinese Patent Application No. 201380043873.4, and an English Translation of the Office Action. (8 pages).

* cited by examiner

ROTATING ELECTRIC MACHINE WITH SHAFT-SEAL DEVICES HAVING PARTITION PLATE

TECHNICAL FIELD

The present invention relates to a rotating electric machine, and more particularly to a rotating electric machine including shaft-seal devices.

BACKGROUND ART

As for a rotating electric machine such as a turbine generator or the like, a gas of hydrogen or the like is used as a cooling medium, for cooling the interior of the machine. The cooling medium is sealed within the rotating electric machine by shaft-seal devices using sealing rings (for example, refer to Patent Documents 1 through 5). In that shaft-seal device, an oil passes through an oil feed pipe, and is supplied into a rear chamber of a sealing ring. The oil moves from that chamber toward inner circumferential side of the sealing ring. According to the structure described above, a rear-face temperature of the sealing ring is lowered in its portion close to an oil supply opening(s). Because the sealing ring cannot expand (nor deform), an oil film which covers the shaft becomes thinner in the portion close to the oil supply opening(s), so that temperatures of the oil film rise.

The rise in temperatures of the oil film gives rise to cause damage to the sealing ring. In order to curb variations of the temperatures, a sealing ring is manufactured with its inner diameter made larger in advance, resulting in excessively consuming the oil. The specifications of constituent components (pumps, filters, and the like) of the shaft-seal devices are designed to cope with this excessive amount of oil. In order to curb the amount of oil required to seal the gas, it is suitably adopted in that a plurality of oil-supply directions is made toward the sealing ring (for example, refer to Patent Document 1).

RELATED ART DOCUMENTS

Patent Documents

[Patent Document 1] Japanese Laid-Open Patent Publication No. S58-5568
[Patent Document 2] Japanese Laid-Open Patent Publication No. S58-186353
[Patent Document 3] Japanese Laid-Open Patent Publication No. S61-85030
[Patent Document 4] Japanese Laid-Open Patent Publication No. S64-8839
[Patent Document 5] Japanese Laid-Open Patent Publication No. H09-303406

SUMMARY OF THE INVENTION

Problems to be Solved by the Invention

The present invention has been directed at solving these problems described above, and an object of the invention is to uniformize a temperature distribution of a sealing ring with a simple structure.

Means for Solving the Problems

A rotating electric machine with shaft-seal devices mounted thereon according to the present invention comprises a rotor having a shaft; a stator disposed in a circumferential surrounding of the rotor; a sealing ring having a plurality of through holes formed therein, being disposed in a circumferential surrounding of the shaft; a gland seal having an oil supply opening therein, for enclosing a circumferential surrounding of the sealing ring; a partition plate disposed between the sealing ring and the gland seal; and a housing on which the gland seal is fixed, for accommodating the rotor and the stator.

Effects of the Invention

According to the rotating electric machine of the present invention with those shaft-seal devices mounted thereon, a temperature distribution of the sealing ring can be uniformized with the simple structure.

EMBODIMENTS FOR CARRYING OUT THE INVENTION

Figure 1:
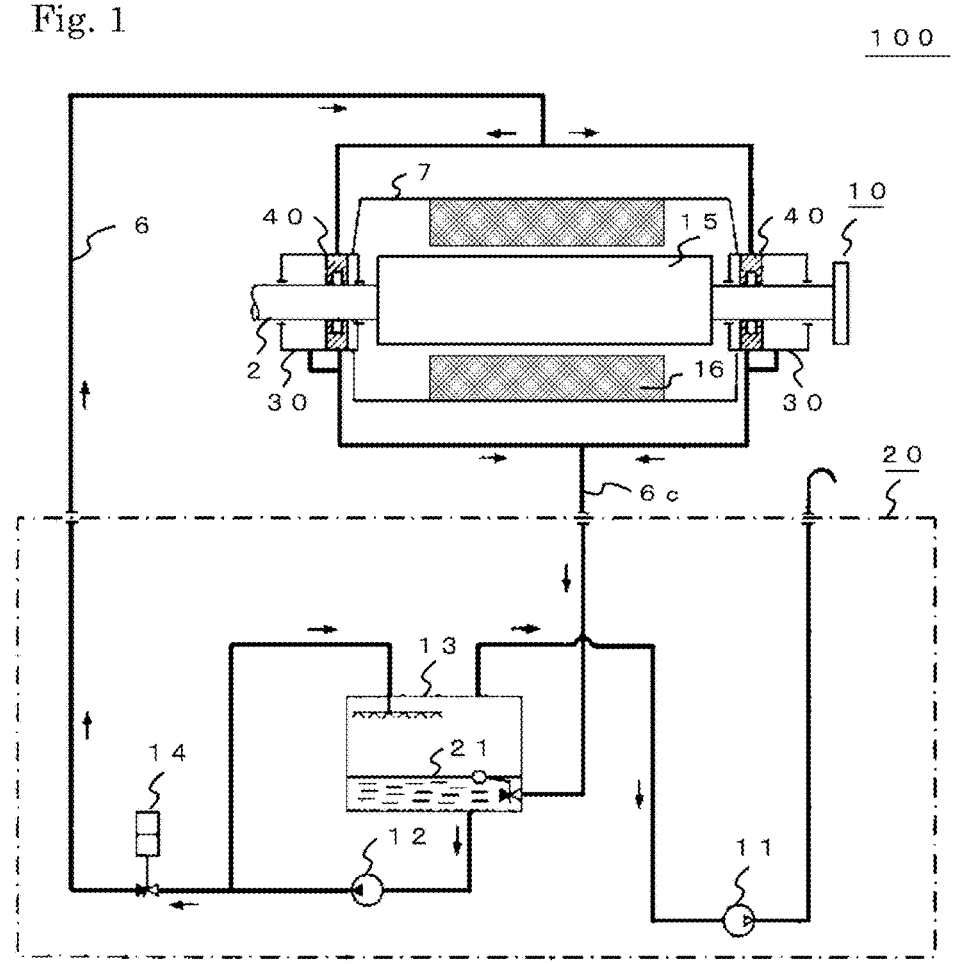
FIG. 1 is a diagram illustrating an overall configuration of a shaft-seal-device-mounted rotating electric machine according to embodiments of the present invention.

Hereinafter, the explanation will be made in more detail referring to the drawings for the embodiments of a rotating electric machine with shaft-seal devices mounted thereon according to the present invention. Note that, the present invention is not limited to those statements described below, and can appropriately be modified within the scope not departing from the gist of the invention. In the drawings, those constituent elements to which the same reference numerals and symbols are given designate the same or corresponding constituent elements.
Embodiment 1.

Hereinafter, the explanation will be made referring to the drawings for Embodiment 1 of the present invention. FIG. 1 is a diagram illustrating an overall configuration of a shaft-seal-device-mounted rotating electric machine 100 including a rotating electric machine 10 and an oil supply device 20. The rotating electric machine 10 such as a turbine generator or the like is constituted of a housing 7, a rotor 15, a stator 16, shaft-seal mechanisms 40, and the like. On the rotor 15, a shaft 2 is mounted. Both ends of the shaft 2 are supported by means of plain bearings 30. The oil supply device 20 is constituted of a vacuum pump 11, a sealing oil pump 12, a vacuum tank 13, a differential pressure control valve 14, and the like. In the vacuum tank 13, a sealing oil 21 is stored. The rotating electric machine 10 and the oil supply device 20 are connected by way of oil feed pipes 6 to each other. The sealing oil 21 passes through the oil feed pipes 6, and is supplied into the shaft-seal mechanisms 40. The sealing oil 21 ejected from the shaft-seal mechanisms 40 passes through oil recovery pipes 6c, and returns into the vacuum tank 13. In the interior of the rotating electric machine 10, a hydrogen gas is filled. The hydrogen gas is circulated in order to enhance a cooling effect thereby.

Figure 2:
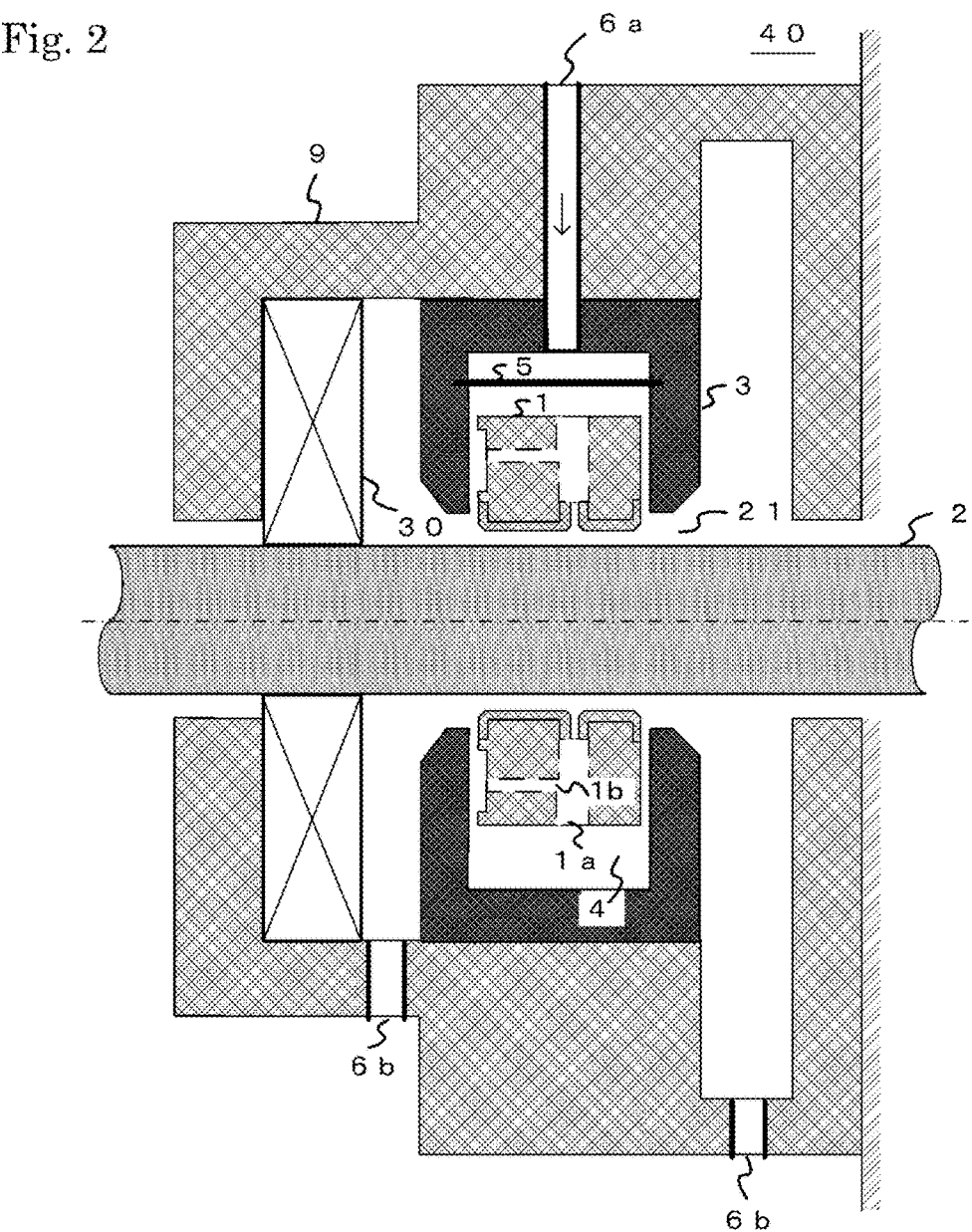
FIG. 2 is a lateral section view illustrating a structure of a shaft-seal mechanism according to Embodiment 1 of the present invention.

FIG. 2 is a section view illustrating a structure of the shaft-seal mechanism 40. The left side of the figure is an outer lateral side of the machine. By supplying the sealing oil 21, having a higher pressure than the gas pressure, between the shaft 2 and a sealing ring 1, the gas is prevented from leaking from the housing 7. A gland seal 3 encloses the circumferential surroundings of the sealing ring 1, and takes on a structure to accommodate the sealing ring 1. The sealing ring 1 is disposed to surround the shaft 2. An interspace between the sealing ring 1 and the gland seal 3 is referred to as a rear chamber 4. The sealing oil 21 having been passed through the oil feed pipe 6 flows through an oil supply opening 6a of the gland seal 3 into the rear chamber 4, and outflows from oil drain openings 6b of a bracket 9.

The sealing oil 21 is thoroughly filled between the bracket 9 and the shaft 2. The sealing ring 1 floats, with respect to the shaft 2, by the pressure of an oil film formed in an interspace between the sealing ring 1 and the shaft 2. A size of the interspace is determined in such a way that the sealing ring 1 does not contact with the shaft 2 during the operation of the rotating electric machine 10. In order to reduce an oil amount of the sealing oil 21, it is effective to make the interspace smaller. In the sealing ring 1, through holes being formed are oil-supply regulatory or adjustment holes 1a that pass through the sealing ring in perpendicular to the shaft 2, and also formed are oil-supply adjustment holes 1b that are drilled in the sealing ring in axial directions of the shaft 2 so that they are also allowed to communicate with the oil-supply adjustment holes 1a. A partition plate 5 is fixed along on inner circumferential sides of the gland seal 3. The oil recovery pipes 6c are connected to the oil drain openings 6b.

Figure 3:
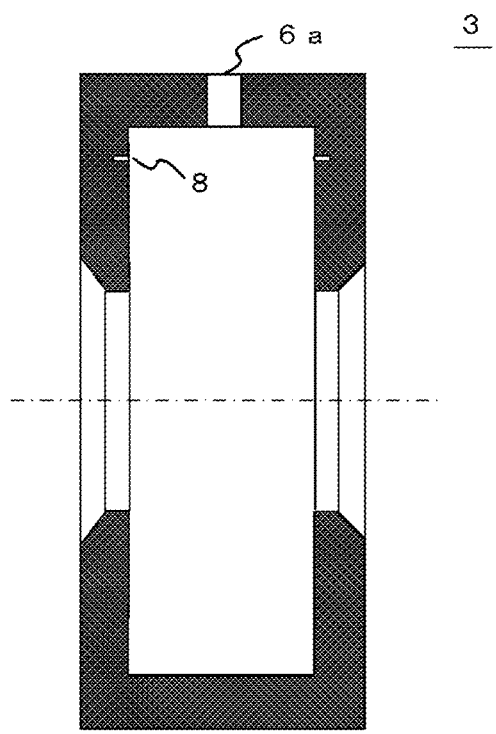
FIG. 3 is a lateral section view illustrating a structure of a gland seal according to Embodiment 1 of the present invention.

FIG. 3 is a section view illustrating a structure of the gland seal 3. In the gland seal 3, the oil supply opening 6a, and grooves or channels 8 are formed. The channels 8 are machined so as to enclose only a portion of the circumferential surroundings of the sealing ring 1. Into the channels 8, the partition plate 5 made of metal is inserted. The partition plate 5 is placed at a position opposing to the oil supply opening 6a so as to interrupt the flow of the sealing oil 21 having flowed from the oil supply opening 6a. The channels 8 are formed along on the inner circumferential sides of the gland seal 3. The oil feed pipe 6 is connected to the oil supply opening 6a.

Figure 4:
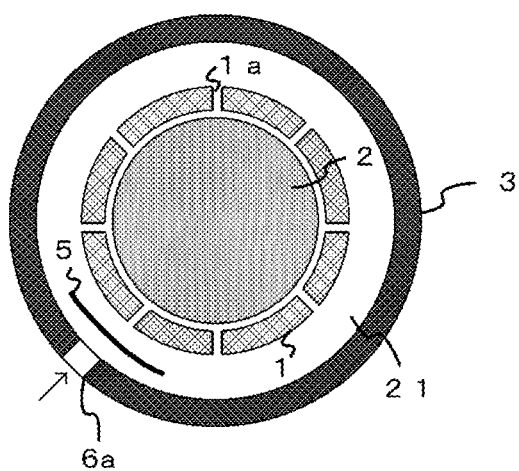
FIG. 4 is a front section view illustrating a structure of the shaft-seal mechanism according to Embodiment 1 of the present invention.

FIG. 4 is a front section view illustrating a structure of the shaft-seal mechanism 40. The partition plate 5 opposes to the oil supply opening 6a. In the rear chamber 4, only the rear chamber that is near or close to the oil supply opening 6a is radially divided into two by the partition plate 5. By using the partition plate 5, the sealing ring 1 is prevented from being significantly cooled in its vicinity to the oil supply opening 6a. The sealing oil 21 passes through the oil supply opening 6a, and comes into collision with the partition plate 5, so that the oil is diverted as split flows, and then supplied into the rear chamber 4. Moreover, the sealing oil 21 passes through the oil-supply adjustment holes 1a of the sealing ring 1, and spreads in radial flows from the outer diameter side of the sealing ring to the inner diameter side of the sealing ring. The sealing oil 21 supplied between the shaft 2 and the sealing ring 1 forms an oil film between the shaft 2 and the sealing ring 1, and seals the gas of hydrogen or the like filled in the rotating electric machine 10.

Here, a structure is adopted in which, in vicinity to the oil supply opening 6a, a hole(s) for adjusting the amount of oil is not opened in the partition plate 5. According to this arrangement, by eliminating temperature difference in a circumferential direction of the sealing ring and curbing distortion thereof, it is possible to make the interspace smaller and to reduce the amount of oil. In a case in which, in vicinity to the oil supply opening 6a, an oil-amount adjustment hole(s) is to be opened in the partition plate 5, the sealing oil may pass through the oil-amount adjustment hole(s) of this partition plate 5, resulting in directly cooling the sealing ring. According to the structure as described above, it is prevented from the case that the sealing oil 21 significantly cools one specific spot of the sealing ring 1, and thus the sealing ring having high reliability can be obtained. The partition plate 5 takes on a shape to be inserted into the channels 8 of the gland seal 3, so that the functions described above can be achieved with a relatively simple structure.

Embodiment 2.

Figure 5:
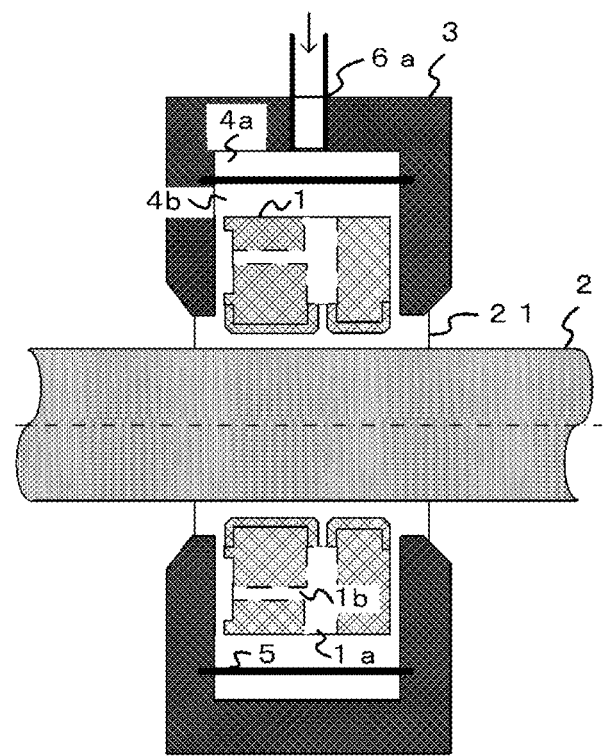
FIG. 5 is a lateral section view illustrating a structure of a shaft-seal mechanism according to Embodiment 2 of the present invention.

Hereinafter, the explanation will be made for Embodiment 2 referring to the drawings. FIG. 5 is a section view illustrating a structure of the shaft-seal mechanism 40 according to Embodiment 2. On the inner side of the gland seal 3, the partition plate 5 of cylindrically shaped is fixed. The sealing ring 1 is placed so as to surround the shaft 2. A rear chamber formed between the sealing ring 1 and the gland seal 3 is separated into an outer rear chamber 4a and an inner rear chamber 4b by means of the partition plate 5. The sealing ring 1 is accommodated in the gland seal 3. The sealing oil 21 flows through the oil supply opening 6a formed in the gland seal 3 into the outer rear chamber 4a, and outflows through the oil supply opening 6b formed in the bracket 9.

The sealing ring 1 floats, with respect to the shaft 2, by the pressure of an oil film formed in an interspace between the sealing ring 1 and the shaft 2. A size of the interspace is determined in such a way that the sealing ring 1 does not contact with the shaft 2 during the operation of the rotating electric machine 10. In order to reduce an oil amount of the sealing oil 21, it is effective to make the interspace smaller. In the sealing ring 1, through holes being formed are the oil-supply adjustment holes 1a that pass through the sealing ring in perpendicular to the shaft 2, and also formed are the oil-supply adjustment holes 1b that are drilled in the sealing ring in axial directions of the shaft so that they are also allowed to communicate with the oil-supply adjustment holes 1a. The partition plate 5 having a plurality of oil-amount regulatory or adjustment holes is disposed coaxially above the shaft 2, on its outer side than that of the sealing ring 1.

Figure 6:
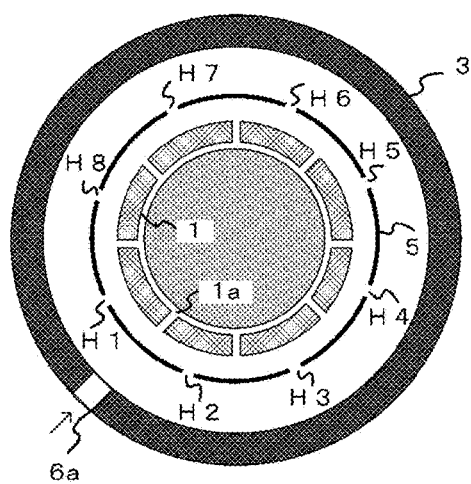
FIG. 6 is a front section view illustrating a structure of the shaft-seal mechanism according to Embodiment 2 of the present invention.

FIG. 6 is a front section view illustrating a structure of the shaft-seal mechanism 40. In the surroundings of the shaft 2, the sealing ring 1 and the partition plate 5 are coaxially disposed to each other. The partition plate 5 surrounds the sealing ring 1 in the entire circumference thereof. In the partition plate 5, oil-amount adjustment holes H1 through H8 are formed. It is preferable that the number of the oil-amount adjustment holes formed in the partition plate 5 is set equal to the number of the oil-supply adjustment holes 1a formed in the sealing ring 1. The sealing oil 21 passes through the oil-amount adjustment holes H1 through H8, and thoroughly fills the outer rear chamber 4a and the inner rear chamber 4b. In order to let the sealing oil 21 move for a long distant as much as possible until the oil film is formed in the circumferential surroundings of the shaft 2, the oil supply opening 6a is disposed at a position where the oil-amount adjustment holes H1 through H8 of the partition plate 5 are not viewable directly below the oil supply opening.

Figure 7:
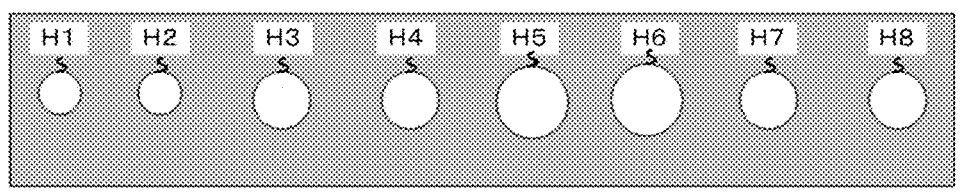
FIG. 7 is a developed view showing a structure of a partition plate according to Embodiment 2 of the present invention.

FIG. 7 shows a developed view of the partition plate 5. In the partition plate 5, the oil-amount adjustment holes H1 through H8 are drilled to define them in an equal space-interval therebetween. In the sizes of the holes, the oil-amount adjustment hole H1 and the oil-amount adjustment hole H2 are the smallest, and the oil-amount adjustment hole H5 and the oil-amount adjustment hole H6 are the largest. The partition plate 5 is disposed in such a manner that a middle portion between the oil-amount adjustment hole H1 and the oil-amount adjustment hole H2 whose sizes are the smallest opposes to the oil supply opening 6a. The oil-amount adjustment holes of the partition plate 5 take on a degree in which the more distant the holes are from the oil supply opening 6a, the larger their sizes become, so that the sealing oil is equally supplied through all of the oil-amount adjustment holes H's. The partition plate 5 takes on a shape to be inserted into grooves or channels of the gland seal 3, so that the functions described above can be achieved with a relatively simple structure.

The sealing oil 21 passes through the oil supply opening 6a, and is at first supplied into the outer rear chamber 4a between the rear chambers. From that chamber, the sealing oil 21 moves along the partition plate 5, and is supplied through any of the oil-amount adjustment holes H1 through H8 into the inner rear chamber 4b. Moreover, the sealing oil 21 passes through the oil-supply adjustment holes 1a of the sealing ring 1, and is supplied between the shaft 2 and the sealing ring 1. The sealing oil 21 forms an oil film between the shaft 2 and the sealing ring 1, and seals the gas filled in the rotating electric machine 10. According to the arrangement described above, it is prevented from the case that the sealing oil 21 significantly cools one specific spot of the sealing ring 1, and thus the sealing ring having high reliability can be obtained.

Note that, in the present invention, each of the embodiments can be freely combined, appropriately modified and/or eliminated without departing from the scope of the invention.

INDUSTRIAL APPLICABILITY

The present invention relating to the shaft-seal devices that are mounted for preventing a cooling gas from leaking out of the shaft is applicable for rotating electric machines subjected to electric power stations.

[Explanation of Numerals and Symbols]

Numeral "1" designates a sealing ring; "1a," oil-supply adjustment hole; "1b," oil-supply adjustment hole; "2," shaft; "3," gland seal; "4," rear chamber; "4a," outer rear chamber; "4b," inner rear chamber; "5," partition plate; "6," oil feed pipe; "6a," oil supply opening; "6b," oil drain opening; "6c," oil recovery pipe; "7," housing; "8," channel; "9," bracket; "10," rotating electric machine; "11," vacuum pump; "12," sealing oil pump; "13," vacuum tank; "14," differential pressure control valve; "15," rotor; "16," stator; "20," oil supply device; "21," sealing oil; "30," plain bearing; "40," shaft-seal mechanism; "H1," through "H8," oil-amount adjustment holes; and "100," rotating electric machine with shaft-seal devices mounted thereon.

What is claimed is:

1. A rotating electric machine with shaft-seal devices mounted thereon, comprising:
    a rotor having a shaft;
    a stator disposed in a circumferential surrounding of the rotor;
    a sealing ring having a plurality of through holes formed therein, being disposed in a circumferential surrounding of the shaft;
    a gland seal having an oil supply opening therein, and having inner walls enclosing a circumferential surrounding of the sealing ring;
    a partition plate disposed between the sealing ring and the gland seal; and
    a housing on which the gland seal is fixed, for accommodating the rotor and the stator,
    wherein the partition plate is fixed to at least one of the inner walls of the gland seal and is directly opposed to the oil supply opening formed in the gland seal,
    wherein channels are formed along respective facing inner circumferential walls of the gland seal, and the partition plate is inserted into the channels.

2. The rotating electric machine with shaft-seal devices mounted thereon as set forth in claim 1, wherein the sealing ring includes an outermost circumferential surface facing away from the shaft, and the partition plate is positioned radially outward from the sealing ring so as to be at a distance from the outermost circumferential surface.

3. The rotating electric machine with shaft-seal devices mounted thereon as set forth in claim 1, wherein a width of the partition plate in a direction parallel to an axial extension of the shaft is greater than a width of the sealing ring along the direction parallel to the axial extension of the shaft.

4. The rotating electric machine with shaft-seal devices mounted thereon as set forth in claim 1, wherein the partition plate is positioned out of contact with the sealing ring.

5. The rotating electric machine with shaft-seal devices mounted thereon as set forth in claim 1, wherein the partition plate surrounds the sealing ring in the entire circumference thereof.

6. The rotating electric machine with shaft-seal devices mounted thereon as set forth in claim 5, wherein a plurality of oil-amount adjustment holes is opened in the partition plate.

7. The rotating electric machine with shaft-seal devices mounted thereon as set forth in claim 6, wherein the oil supply opening is disposed to avoid a position where the plurality of oil-amount adjustment holes is viewable directly below the oil supply opening.

8. The rotating electric machine with shaft-seal devices mounted thereon as set forth in claim 7, wherein the plurality of oil-amount adjustment holes takes on a feature in which the more distant the oil-amount adjustment holes are from the oil supply opening formed in the gland seal, the larger their sizes become.

* * * * *